(12) United States Patent
Chliwnyj

(10) Patent No.: US 6,191,542 B1
(45) Date of Patent: Feb. 20, 2001

(54) METHOD AND APPARATUS FOR CLEANING A DC MOTOR COMMUTATOR-BRUSH INTERFACE

(75) Inventor: Alex Chliwnyj, Tucson, AZ (US)

(73) Assignee: International Business Machines Corporation, Armonk, NY (US)

(*) Notice: Under 35 U.S.C. 154(b), the term of this patent shall be extended for 0 days.

(21) Appl. No.: 09/438,514

(22) Filed: Nov. 12, 1999

(51) Int. Cl.[7] .................................................. H02P 5/46
(52) U.S. Cl. ........................... 318/7; 318/244; 242/334; 360/73.14
(58) Field of Search .................................. 318/6, 7, 244, 318/245; 242/324, 334; 360/73.14

(56) References Cited

U.S. PATENT DOCUMENTS

| | | | |
|---|---|---|---|
| 4,015,799 | * 4/1977 | Koski et al. | 317/7 |
| 4,125,881 | * 11/1978 | Eige et al. | 318/7 |
| 4,398,227 | * 8/1983 | Anderson | 318/7 |
| 5,576,905 | * 11/1996 | Garcia | 360/73.14 |

* cited by examiner

Primary Examiner—Khanh Dang
(74) Attorney, Agent, or Firm—James A. Pershon; Robert M. Sullivan

(57) ABSTRACT

Commutators on a direct current motor run at low speed for an extended period of time get covered with a coating that makes the interface between the commutator and the brushes unreliable especially with the low speed, low current operation. This is especially true for drive motors in a data processing tape drive unit where speed control is critical. The brush to commutator interface can be cleaned by applying a very high electrical current to the motor and varying the polarity of the current with a variable duty cycle to obtain the maximum cleaning currents in a relatively short time without dismantling the motors.

20 Claims, 2 Drawing Sheets

METHOD AND APPARATUS FOR CLEANING A DC MOTOR COMMUTATOR-BRUSH INTERFACE

BACKGROUND OF THE INVENTION

The present invention relates generally to the field of electric motor repair and more specifically to the repair of a commutator to brush interface in a direct current motor without dismantling the motor.

In particular operations using a direct current, the commutator to brush interface can get dirty or covered with a coating commonly called a "varnish" which can cause intermittent and unreliable operation. The speed can vary causing undependable rotation. In a tape drive for a data processing system, constant motion of a tape over a transducer is compulsory. Any hindrance to a constant speed causes errors in the reading or writing of the data from the tape which can result in a failure in the data processing system. The rotational speed of the motor and thereby the linear speed of the tape must not vary. Reel to reel motion control systems in tape drives set the DC tension on the tape using calculated motor currents. When the motors are run at low currents for long periods of time the brushes get dirty and the connection to the commutator becomes unreliable. This results in data errors and tape damage when the system tries to move the tape and maintain the proper tension of the tape between the two reels. Brush motors cannot operate with small currents through the brushes for long periods of time in a servo control application such as magnetic tape drives. A high current density through the brush-commutator interface as well as high speeds are required to keep the interface clean and thereby maintain speed reliability. These are not always available especially in tape drives used in data processing systems. The tape has gotten very thin and consequently the tape drive required much lower current to maintain tape tension between the reels. the currents required for steady state motion are low once the tape is moving since the energy required to maintain constant motion is small. For a majority of the time, the motors are operating in a region, low current and low speed, where the self-cleaning action of the brush-commutator interface cannot take place.

A common method for cleaning the commutator-brush interface of a motor to spray the commutator with FREON, a chlorofluorocarbon compound, and then let the compound dry. An advantage of this cleaning method is that the FREON evaporates rapidly thereby eliminating any doubt about the armature windings having dried after being soaked by this cleaning process. Operation of the motor with wet windings must be avoided, as short-circuiting of the windings may occur. The indeterminate drying process and the environmental-unfriendliness attributed to the use of chlorofluorocarbons makes this process unusable, especially in a data processing system.

Another common solution is to dismantle the tape drive and remove and disassemble the motor for cleaning. In a small data processing system, the disconnection of the tape drive unit completely disrupts the operation of the data processing system and essentially shuts down its function. In a large data process unit, at minimum the productivity is affected.

An object of the present invention, therefore, is to provide a process for reinstating the reliability of a motor, especially a motor used in a tape drive, without dismantling the tape drive and/or the motor and without the use of unfriendly, environmentally undesirable products.

SUMMARY OF THE INVENTION

The present invention provides a method for cleaning a commutator-brush interface in a direct current motor comprising applying a very high electrical current to the motor. The polarity of the electrical current is alternated and implemented in a variable duty cycle. The motor can remain in the drive during the cleaning process. Neither the motor nor the unit driven by the motor needs to be dismantled.

Specifically, a controlled constant speed direct current motor has its commutator cleaned by applying a square wave alternating polarity direct current to the motor. The motor is particularly useful in tape drives for data processing systems or anyplace where a controlled speed motor is required. The alternating polarity square wave direct current is preferably applied in a variable duty cycle in order to control the heat buildup in the motor. The cleaning is accomplished by burning off the coating on the commutator and restoring an intimate electric contact between the commutator and the brushes of the motor.

This invention uses a method and apparatus for cleaning the brush-commutator interface of a direct current motor by delivering a maximum amount of alternating polarity direct current to the motor. The method and apparatus can be used and activated anytime the motor is inactive and the drive operated by the motor is idle. The objective of the cleaning cycle is to apply large currents to the motor while allowing the rotation in reversing directions to clean all of the commutator segments. The maximum current through the motor is obtained by reversing the direction of the applied voltage and resultant current so no appreciable rotation of the motors is achieved. The apparatus of the invention includes adding a controllable pulse width modulated motor cleaning power supply to the tape motion control unit with a motor cleaning control unit to selectively apply the output of the motor cleaning power supply to the motor when the tape motion control unit is inactive.

In the method of cleaning a commutator-brush interface of a direct current motor, the process includes the steps of connecting a cleaning power supply to a motor. The cleaning power supply is adjusted to produce a pulsed square wave current of alternating polarity and adjustable frequency. The period of the waveform and the peak current is selected based on the wattage and mass of the motor. The current waveform may be selected to provide either a slow net rotation of the motor or no net rotation. Tachometer signals from the tape motion control unit may be monitored to diagnose the cleanliness of the brush-commutator interface. The current may be varied to reverse the net rotation of the motor. The motor cleaning control unit can monitor the leaning process to monitor the output of the motor to increase the asymmetry of the duty cycle and invoke and control a longer cleaning cycle or produce a diagnostic message of a motor problem. The motors of a two reel tape drive unit may have each motor independently cleaned or both motors cleaned and monitored at the same time. The cleaning process may occur on each and every tape cartridge unload operation.

The present invention enables processes for cleaning commutators on motors while the motors are installed in the unit driven by the motor. The present invention enables cleaning processes which are fast and easy, without dismantling the unit nor the motor itself. The cleaning process according to this invention can be performed in the field where the unit is used and does not require removal of the unit or the motor for a cleaning process at the factory. In addition to other benefits realized from these improvements, significant cost advantages result from these improvements. For all of these reasons, the present invention provides substantial advantages over the prior art.

An object of the present invention, therefore is to provide an enhanced method for cleaning a commutator-brush interface in a direct current motor.

Another object of the present invention is to provide a method and process for cleaning a commutator-brush interface in a motor while the motor is installed in a unit driven by or operated in the unit.

Still another object of the present invention is to provide a process that cleans a commutator-brush interface in a direct current controlled speed motor useful in a tape drive of a data processing system.

Yet another object is to provide a method of cleaning a commutator-brush interface in a motor that can be controlled and provides information showing the results of the cleaning process.

The foregoing, and other objects, features and advantages of the invention will become more apparent to those skilled in the art after considering the following detailed description in connection with the accompanying drawing in the reference numbers designate like parts throughout.

DESCRIPTION OF EMBODIMENTS

Figure 1:
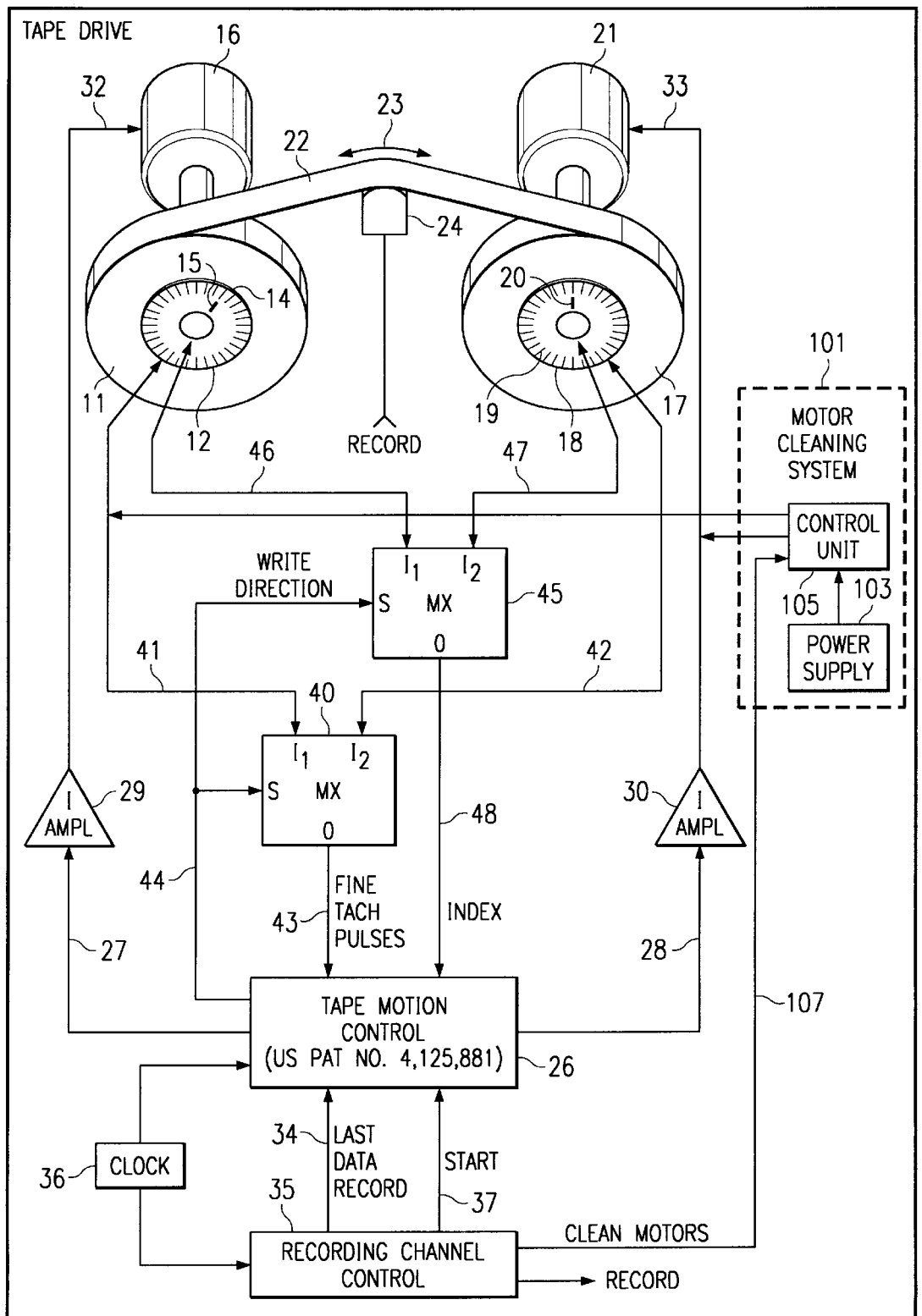
FIG. 1 is a logical schematic diagram showing a tape drive with a tape motion control unit including a motor cleaning unit according to the present invention.

The present invention is based upon a fundamental problem that occurs when using large brush type motors and the steady state currents are not enough to keep the brush and commutator clean. Brush motors cannot operate with small currents through the brushes for long periods of time such as in servo control applications. A sufficient current density through the brush-commutator interface is required to keep the interface clean. There are many different brush formulations to address the problems of both brush wear and god electrical contact with the commutator. With usage, the commutators of the motors become dirty. In systems where large motors are used to provide a start and stop operation, the large currents are not large as required for operations that would clean the brush to commutator interface. In many instances, the currents required for state-to-state motions are very small. In these instances, the motors are operated in a region where the self cleaning action of the brush to commutator interface which would normally occur with large currents does not take place. This is especially true in motors used in magnetic tape drives for data processing systems.

In present day magnetic tape drive systems, the large motors provide the quick start and stop operation that the data processing systems require. The magnetic tape itself has gotten thinner and thinner and consequently the system requires much lower current to maintain the tape tension between the reels of the tape drive. Once the tape is moving, the tape drive is a very low friction system and the energy required to maintain constant motion is small. The self cleaning action of the brush to commutator interface is not available because the large currents are not used.

In the tape drives of the present day data processing system, the control system of the tape drives relies on the motors delivering the requested torque immediately. The design uses constant current drivers with a digital to analog converter that the control processor uses to command the requested current. If the brushes of the motor are not making perfect contact with the commutator due to a dirty commutator segment, there will be a momentary loss of tension in the tape and this can lead to tape damage and a loss of data. When the control loop is unable to obtain the requested torque from the motor because of a dirty commutator segment, there is a dip in the tension or velocity. The control loop responds to the disturbance and keeps commanding a larger and larger torque without any effect on the motor. Finally the motor rotates sufficiently to bring another section of the commutator in contact with the brush and the motor can then deliver the requested torque. To this point, the requested torque is very high and the loop overcorrects and there can be a momentary over-tension event. The under flash over-tension event can lead to tape damage as the tape is snapped from a slack position to a high tension position. Thus the present invention of providing a method and apparatus for cleaning a DC motor brush to communicator interface is especially important when used in a tape drive system for a data processing unit. Thus the detail description of the preferred embodiment will be discussed with respect to the cleaning operation for motors especially used in the tape drives for the data processing systems.

Tape motion control as used herein connotates the specific procedure in apparatus described in incorporated U.S. Pat. Nos. 4,125,881 and 4,015,799, both assigned to the assignee of the present invention and incorporated herein by reference in their entirety. Also incorporated by reference is U.S. Pat. No. 5,576,905 issued on Nov. 19, 1996 to Garcia, et al and assigned to the assignee of this invention. The preferred embodiment of the present invention is directed mainly for motors used in tape drives because of the operation of the tape drives. But it should be understood that the cleaning operation of the present invention can be used on any motors that use direct current to provide a quick start and a quick repositioning and reversal of the motors during their operation. The invention will be particularly described with reference to the tape drive as shown in FIG. 1.

The invention can be understood with reference to FIG. 1 where a bi-directional reel-to-reel tape drive 10 includes a pair of reels 11 and 17 each driven by a respective motor 16 and 21. Mounted to the drive shaft of each of the motors 16 and 21 is a fine line tachometer 12 and 18, respectively, with an outer circular array of fine tachometer lines 14 and 19 and an index line 15 and 20 displaced radially inwardly on a respective coating wheel from the fine line array. A tape 22 is wound on the reels 11 and 17 and the motors 16 and 21 are controlled to move the tape 22 for recording and playback in either of the two directions indicated by the arrow 23.

Each of the tachometers 12 and 18 functions as tape motion sensors. Each tachometer emits a single pulse in response to an index mark to signify completion of relatively large preselected angles, preferably 360 degrees, that is, once per revolution of the reels 11 and 17. In addition, each of the tachometers 12 and 18 generates a two phase fine tachometer signal comprising two phase displays pulse streams. Fine line tachometer arrays on the tachometers 12 and 18 are identical, each emitting impulses during each revolution of respective reels 11 and 17.

During advance of the tape 22, various parameters such as tape motion, position and tension are monitored in order to derive motor currents having the polarity and magnitude necessary to operate the motors 16 and 21 while recording data on the tape 22. These currents are derived by the algorithm of the incorporated signal '881 patent in response to fine tachometer line and tachometer index signals which are fed to a tape motion control unit 26. The tape motion control unit 26 processes the fine tachometer and index pulses, generating current for the motors 16 and 21 on respective current lines 27 and 28. The signals on the current lines 27 and 28 are amplified at amplifiers 29 and 30, respectively, and the amplified motor currents are conducted to the motors 16 and 21 on the output lines of the amplifiers 32 and 33, respectively.

The tape motion control unit 26 operates to maintain the motors 16 and 21 at constant nominal velocities for recording, reading and searching. The remaining portions of the tape drive 10 as shown in FIG. 1 can be maintained by a review of the '905 patent as referenced herein. The tachometer assembly shown in the '905 patent includes a conventional optical sensor/encoder which produces a stream of tachometer pulses in response to the rotation of the code wheel and an index pulse once each revolution of the code wheel.

Referring again to FIG. 1, presentation of the present invention is a motor cleaning system 101 which includes the power supply 103 and a control unit 105. The power supply 103 directs its current to the control unit 105 where it is distributed to the motors 16 and 21 via the output lines 32 and 33, respectively. The control unit 105 is activated by a signal called the clean motor signal along the line 107. The clean motor signal could be emitted by a recording channel control unit 35 as shown in FIG. 1 or any other control unit. The present invention uses the method and apparatus for cleaning the motors with the objective being to deliver the maximum amount of current to the brush-commutators interface in the shortest time. The solution is to use a method of cleaning the motors that can be used during the time that the tape drive cartridge has been unloaded from the tape drive and the drive is idle. The objective of the cleaning cycle is to apply large currents to the motors while rotating the motors slowly to clean all of the commutator segments.

Spinning the motors at high speed to clean the brush-commutator interface is ineffective for this particular problem where the motors are used in a tape drive. The motors of a tape drive are driven by constant current drivers. When the control processors set a value in the DAC register of the control unit 26, the control loop through the amplifiers 29 and 30 tries to deliver the requested current immediately. If a large current is requested, the motor will accelerate quickly and as the motor velocity increases the back electromotive force will increase with rotational velocity of the motor. This will very quickly reduce the current through the motor as the motor comes up to speed. At the full no load speed of the motor, the back electromotive force is very high and the current through the motor is very low. High current through the motor which could be useful for the cleaning process can only be achieved at acceleration or deceleration where the motor back electromotive force is not counter to the applied voltage on the motor. It is only in the stopping process that the back electromotive force of the motor is not counter to the applied voltage. So to obtain maximum current through the motors, it is desirable to start and stop the motors by reversing the direction of the applied voltage and resultant current applied to the motors without achieving any appreciable rotation of the motors. The present invention uses the mass of the motors by reversing the polarity of the applied current as the motor starts to rotate and then rotating the motor in the opposite direction. In one embodiment as shown in FIG. 2, four amperes of peak DC current is attempted to be directed to the motors.

Figure 2:
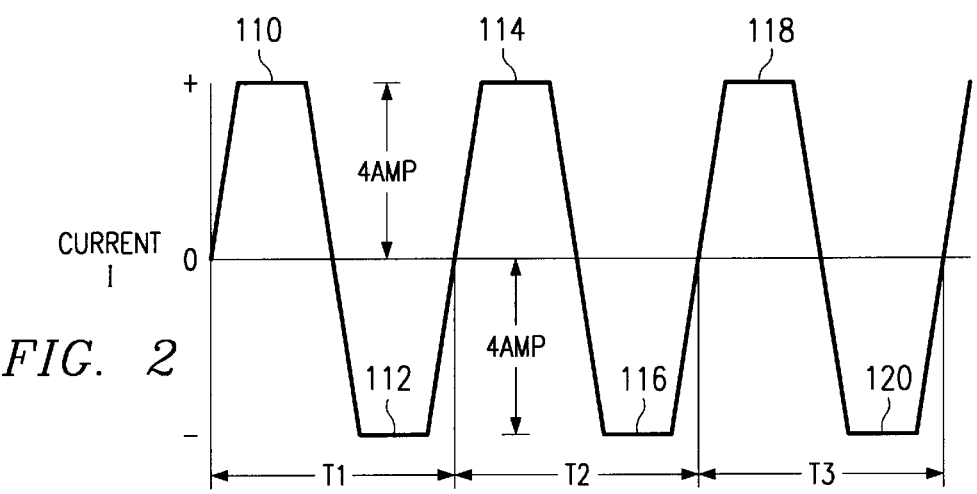
FIG. 2 is a waveform generated by the motor cleaning unit of FIG. 1 according to the present invention showing a duty cycle wherein little or no net rotation of the motor occurs.

As shown in FIG. 2, if a 50% duty cycle voltage waveform is applied to the motors, then the motor will start to turn in one direction only to stop and turn in the opposite direction as the voltage polarity is reversed. Thus the motor will attempt to turn in one direction as the peak current 110 is applied to the motor and then the motor will attempt to rotate in the other direction when a peak current 112 is applied to motor during the time T1. As the progressive alternating peaks of current, such as currents 114, 116, 118 and 120 are directed to the motor, the motor is started and stopped and then started in the reverse direction as applied voltage and resultant current are directed to the motor. To obtain the maximum currents through the motor, it is desirable to start and stop the motor by reversing the direction of the applied voltage and the resultant current through the motor without achieving any appreciable rotation of the motors. The mass of the motors is used by reversing the polarity of the applied current as the motor starts to rotate and then rotating the motor in the opposite direction as is shown in FIG. 2. The motor will start to turn in one direction only to stop and run in the opposite direction when the current is reversed. This will result in the motor causing a "buzzing" noise without any net rotation of the commutator. If the duty cycle is short enough, then the motor will have the maximum current per unit time through the brushes. The period of the waveform is selected based on the available current and the mass of the motor and can easily be determined by experimentation. Once the motor starts to rotate the back electromotive force will determine the current through the motor. The high four amperes of current is sufficient as shown in FIG. 2 to perform a cleaning operation on the brush to commutator interface. Additionally, it is desirous to rotate the motor so that all sections of the commutator can be cleaned and a process for obtaining this is shown in FIG. 3.

Figure 3:
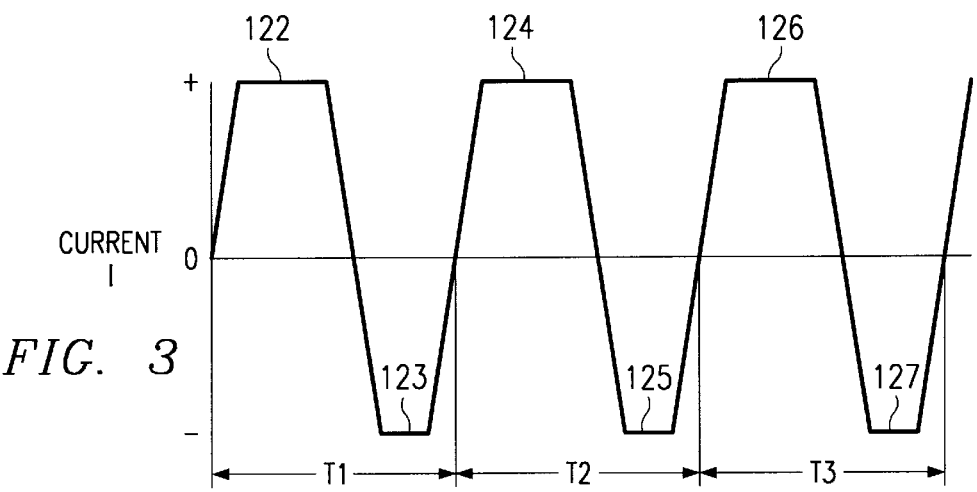
FIG. 3 is a waveform generated by the motor cleaning unit of FIG. 1 according to the present invention showing a duty cycle wherein net, rotation of the motor occurs in one direction.

As shown in FIG. 3, varying the requested current from the 50% duty cycle so that the net current is greater in one direction than the other, the motor can be made to buzz and also rotate slowly in the direction of the higher net current. As shown in FIG. 3, the positive current pulses 122, 124 and 126 envelope a longer period of the times T1, T2 and T3 and thus the motor will rotate further in one direction than in the direction according to the applied negative pulses 123, 125 and 127. The deviation of the duty cycle in FIG. 3 from the 50% duty cycle provides a small rotation of the motor and can be used to diagnose problems with the motor. In the particular embodiment disclosed in FIG. 3, a 10 millisecond versus 12 millisecond duration is the starting point for the current differential. Thus the positive peaks 122, 124, and 126 are retained for the 12 millisecond time while the negative current pulses 123, 125 and 127 are maintained for a 10 millisecond time. These time durations were used as a starting point for the current differential. In the system as shown in FIG. 1, each motor has a fine-line tachometer 12 and 18 connected to motors 16 and 21, respectively. A quadrature signal can be used as disclosed in the '905 patent to obtain direction and velocity information. The tachometer signals are monitored to make sure that the motor is rotated in the expected direction at the desired net rotational velocity. If there is a bad spot on the commutator, then the motor will stall in the slow rotation and again buzz in this spot even with a net current in one direction. The dirty commutator section, in effect, gives a directional bias in the system that cancels out the offset from the 50% duty cycle as shown in FIG. 3 thereby giving a difference in the net current through the motor that is being cleaned. The ability to diagnose a problem during the cleaning cycle and to use this diagnosis to either change the offset in the net current and thereby continue cleaning. This information can also be used to identify the motor as bad and not cleanable. The control system of the recording channel control 35, for instance, will monitor the rotation of the motor and increase the asymmetry of the duty cycle to get the motor correctly rotating again. This can invoke a longer cleaning cycle or a diagnostic message that there may be a problem with the motor. In the preferred embodiment, at the end of 4 seconds, the motors are brought to a stop and the entire operation is repeated in the opposite direction as shown in FIG. 4.

Figure 4:
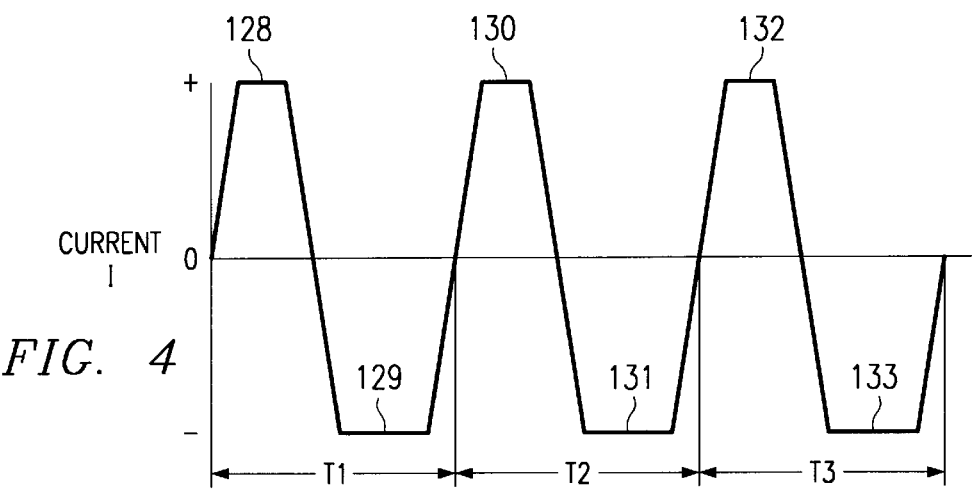
FIG.4 is a waveform generated by the motor cleaning unit of FIG. 1 according to the present invention showing a duty cycle wherein net rotation of the motor occurs in the opposite direction.

As shown in FIG. 4, the duty cycle is reversed to produce a net current in the opposite direction. As shown in FIG. 4, the positive current application pulses 128, 130 and 132 are smaller than the negative current pulses 129, 131 and 133. The motor will slowly rotate in the opposite direction while buzzing as shown in FIG. 3. A net current in the opposite direction is produced. The rotation of the motor is monitored and the duty cycle is adjusted again if there is a bad or dirty spot on the commutator. After the 4 second cleaning operation in each direction, using the pulses of FIG. 3 and FIG. 4 for instance, if no problems are detected, the cleaning operation is ended. The cleaning operation of the preferred embodiment occurs on each and every cartridge unload operation. What has been described herein is that the cleaning operation is performed on a single motor at a time. In the preferred embodiment, both motors are controlled independently by the control algorithms but the cleaning generally takes place concurrently. The cleaning can take place individually but since the brush to commutator interface is the same for both motors, the cleaning generally takes place concurrently.

While the invention has been shown and described with reference to a preferred embodiment thereof, it will be understood by those skilled in the art that various changes in form and detail may be made therein without departing from the spirit, scope and teaching of the invention. For example, in FIG. 1, the motor cleaning system 101 and its control unit 105 is controlled by a clean motors pulse from the recording channel control 35. It should be obvious that the control unit 105 can be activated by many other means such as a manual control to start the cleaning operation. In this regard, a separate system could control the operation such as the insertion and removal of a cartridge from the tape drive system. It should be obvious that other motors than from a tape system may have the same problems and situations that have been described herein. Accordingly, the detailed description given above is to be considered merely as illustrative and the invention is to be limited only as specified in the claims.

What is claimed is:

1. An apparatus for controlling the motion of a magnetic tape in a tape drive including a first reel assembly having a first motor for rotating in a first direction to supply a magnetic tape and for rotating in a second direction to take up the magnetic tape, a second reel assembly having a second motor for rotating in the first direction to take up magnetic tape supplied by the first reel assembly and for rotating in the second direction to supply magnetic tape to the first reel assembly, a first fine-line tachometer coupled to the first reel assembly, and a second fine-line tachometer coupled to the second reel assembly, said apparatus further including:
   a motor cleaning power supply producing an alternating polarity, adjustable current and variable frequency square wave;
   a motor cleaning control unit connected to selectively supply the output current from said motor cleaning power supply to the first and second motors; and
   means for activating said motor cleaning control unit to clean a brush-commutator interface of the motor connected to said motor cleaning power supply when the tape drive is otherwise inactive.

2. The apparatus of claim 1 wherein said motor cleaning power supply produces a controlled pulse width modulated current in the cleaning cycle to produce no net rotation of the motor or a net rotation of the motor in either direction.

3. The apparatus of claim 2 wherein said motor cleaning power supply produces a four ampere pulse current in a 50% duty cycle to produce a no net rotation of the motor through the cleaning cycle.

4. The apparatus of claim 1 wherein the motor being cleaned and its fine-line tachometer are sensed and monitored to ensure that the motor being cleaned is rotating in the expected direction at the desired net rotational velocity.

5. The apparatus of claim 4 wherein both motors are cleaned concurrently.

6. The apparatus of claim 4 wherein the fine-line tachometer is sensed during the cleaning cycle to determine if the motor is bad.

7. The apparatus of claim 4 wherein the fine-line tachometer is sensed during the cleaning cycle to determine if the cleaning cycle should be ended or extended for more cleaning.

8. The apparatus of claim 1 wherein said motor cleaning power supply produces a controlled pulse width modulated current in the cleaning cycle wherein the positive pulses are applied for a longer period of each cycle to produce a net rotation of the motor in one direction.

9. The apparatus of claim 1 wherein said motor cleaning power supply produces a controlled pulse width modulated current in the cleaning cycle wherein the negative pulses are applied for a longer period of each cycle to produce a net rotation of the motor in the other direction.

10. The apparatus of claim 1 wherein said motor cleaning power supply produces a controlled pulse width modulated current in the cleaning cycle wherein the positive pulses are applied for a longer period of each cycle to produce a net rotation of the motor in one direction and then the negative pulses are applied for a longer period of each cycle to produce a net rotation of the motor in the other direction.

11. A motor cleaning apparatus for cleaning a brush-commutator interface of a direct current motor without disassembling the motor comprising:
   a motor cleaning power supply producing an alternating polarity, adjustable current and variable frequency square wave;
   a motor cleaning control unit connected to selectively supply the output current from said motor cleaning power supply to the motor; and
   means for activating said motor cleaning control unit to clean the brush-commutator interface of the motor connected to said motor cleaning power supply.

12. The apparatus of claim 11 wherein said motor cleaning power supply produces a controlled pulse width modulated current in the cleaning cycle to produce no net rotation of the motor.

13. The apparatus of claim 11 wherein said motor cleaning power supply produces a controlled pulse width modulated current in the cleaning cycle to produce a net rotation of the motor in either direction.

14. The apparatus of claim 11 wherein said motor cleaning power supply produces a controlled pulse width modulated current in the cleaning cycle wherein the positive pulses are applied for a longer period of each cycle to produce a net rotation of the motor in one direction.

15. The apparatus of claim 11 wherein said motor cleaning power supply produces a controlled pulse width modulated current in the cleaning cycle wherein the negative pulses are applied for a longer period of each cycle to produce a net rotation of the motor in the other direction.

16. The apparatus of claim 11 wherein said motor cleaning power supply produces a controlled pulse width modulated current in the cleaning cycle wherein the positive pulses are applied for a longer period of each cycle to produce a net rotation of the motor in one direction and then the negative pulses are applied for a longer period of each cycle to produce a net rotation of the motor in the other direction.

17. A method for cleaning a brush-commutator interface of a direct current motor without disassembling the motor comprising:

producing an electrical current having an alternating polarity, adjustable current and variable frequency square wave; and applying the electrical current to the motor clean to clean the brush-commutator interface of the motor.

18. The method of claim 17 wherein said motor cleaning power supply produces a controlled pulse width modulated current in the cleaning cycle wherein the positive pulses are applied for a longer period of each cycle to produce a net rotation of the motor in one direction.

19. The method of claim 17 wherein said motor cleaning power supply produces a controlled pulse width modulated current in the cleaning cycle wherein the negative pulses are applied for a longer period of each cycle to produce a net rotation of the motor in the other direction.

20. The method of claim 17 wherein said motor cleaning power supply produces a controlled pulse width modulated current in the cleaning cycle wherein the positive pulses are applied for a longer period of each cycle to produce a net rotation of the motor in one direction and then the negative pulses are applied for a longer period of each cycle to produce a net rotation of the motor in the other direction.

* * * * *